US009228534B2

(12) United States Patent
Jain et al.

(10) Patent No.: US 9,228,534 B2
(45) Date of Patent: Jan. 5, 2016

(54) VARIABLE CONTOUR NACELLE ASSEMBLY FOR A GAS TURBINE ENGINE

(75) Inventors: Ashok K. Jain, Tempe, AZ (US); Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 1483 days.

(21) Appl. No.: 11/772,287

(22) Filed: Jul. 2, 2007

(65) Prior Publication Data
US 2009/0008508 A1    Jan. 8, 2009

(51) Int. Cl.
*F02C 7/042* (2006.01)
*F02K 3/06* (2006.01)
*B64D 33/02* (2006.01)
*F02C 7/045* (2006.01)

(52) U.S. Cl.
CPC . *F02K 3/06* (2013.01); *B64D 33/02* (2013.01); *F02C 7/042* (2013.01); *F02C 7/045* (2013.01); *F05D 2270/62* (2013.01); *F05D 2270/64* (2013.01); *F05D 2300/505* (2013.01); *Y02T 50/671* (2013.01); *Y10T 137/0645* (2015.04)

(58) Field of Classification Search
CPC ............ F02C 7/04; F02C 7/042; F02C 7/045; F02C 7/057; F05D 2270/1022; F02K 3/06; B64D 33/02
USPC ................. 244/53 B; 137/15.1, 15.2; 60/779, 60/39.091, 233, 226.3
See application file for complete search history.

(56) References Cited

U.S. PATENT DOCUMENTS

| | | |
|---|---|---|
| 2,948,111 A | 5/1955 | Nelson |
| 3,074,232 A | 1/1963 | Soyer |
| 3,119,581 A | 1/1964 | Trevaskis |
| 3,222,863 A | 12/1965 | Klees et al. |
| 3,568,694 A | 3/1971 | Johnson |
| 3,611,724 A | 10/1971 | Kutney |
| 3,664,612 A | 5/1972 | Skidmore et al. |
| 3,716,209 A | 2/1973 | Pierce |
| 3,763,874 A | 10/1973 | Wilde et al. |

(Continued)

FOREIGN PATENT DOCUMENTS

| | | |
|---|---|---|
| GB | 1070458 | 6/1965 |
| GB | 1312619 | 4/1973 |

(Continued)

OTHER PUBLICATIONS

Extended European Search Report for Application No. 08252429.9 mailed Nov. 26, 2008.

(Continued)

*Primary Examiner* — Andrew Nguyen
(74) *Attorney, Agent, or Firm* — Carlson, Gaskey & Olds

(57) ABSTRACT

A gas turbine engine includes a compressor section, a combustor section, a turbine section and a nacelle assembly which at least partially surrounds the compressor section, the combustor section and the turbine section. At least a portion of the nacelle assembly includes an adjustable contour. The portion of the nacelle assembly including the adjustable contour is selectively moveable between a first portion and a second position to influence the adjustable contour of the nacelle assembly. A controller identifies an abnormal aircraft operating condition and selectively moves the portion of the nacelle assembly including the adjustable contour between the first position and the second position in response to detecting the abnormal aircraft operating condition.

16 Claims, 5 Drawing Sheets

(56) References Cited

U.S. PATENT DOCUMENTS

| | | | |
|---|---|---|---|
| 3,932,058 A | 1/1976 | Harner et al. | |
| 4,007,891 A | 2/1977 | Sorensen et al. | |
| 4,012,013 A | 3/1977 | Ball et al. | |
| 4,044,973 A | 8/1977 | Moorehead | |
| 4,068,469 A | 1/1978 | Adamson | |
| 4,083,181 A | 4/1978 | Adamson | |
| 4,132,240 A | 1/1979 | Frantz | |
| 4,147,029 A | 4/1979 | Sargisson | |
| 4,199,295 A | 4/1980 | Raffy et al. | |
| 4,242,864 A | 1/1981 | Cornett et al. | |
| 4,351,502 A | 9/1982 | Statkus | |
| 4,540,143 A | 9/1985 | Wang et al. | |
| 4,722,357 A | 2/1988 | Wynosky | |
| 4,827,712 A | 5/1989 | Coplin | |
| 4,865,268 A | 9/1989 | Tracksdorf | |
| 4,899,958 A | 2/1990 | Horikawa | |
| 4,912,921 A | 4/1990 | Rice et al. | |
| 4,993,663 A | 2/1991 | Lahti et al. | |
| 5,000,399 A | 3/1991 | Readnour et al. | |
| 5,012,639 A | 5/1991 | Ream et al. | |
| 5,014,933 A * | 5/1991 | Harm et al. | 244/53 B |
| 5,058,617 A | 10/1991 | Stockman et al. | |
| 5,127,222 A | 7/1992 | Ream et al. | |
| 5,143,329 A | 9/1992 | Coffinberry | |
| 5,145,126 A | 9/1992 | Patilla | |
| 5,177,957 A | 1/1993 | Grieb | |
| 5,261,227 A | 11/1993 | Giffin, III | |
| 5,284,012 A | 2/1994 | Laborie et al. | |
| 5,297,765 A | 3/1994 | Hughes et al. | |
| 5,351,476 A | 10/1994 | Laborie et al. | |
| 5,361,828 A | 11/1994 | Lee et al. | |
| 5,447,283 A | 9/1995 | Tindell | |
| 5,586,431 A | 12/1996 | Thonebe et al. | |
| 5,593,112 A | 1/1997 | Maier et al. | |
| 5,626,017 A | 5/1997 | Sattelmayer | |
| 5,665,916 A | 9/1997 | Puster et al. | |
| 5,743,488 A | 4/1998 | Rolston et al. | |
| 5,987,880 A | 11/1999 | Culbetson | |
| 6,089,505 A | 7/2000 | Gruensfelder et al. | |
| 6,109,566 A | 8/2000 | Miller et al. | |
| 6,129,311 A | 10/2000 | Welch et al. | |
| 6,179,251 B1 | 1/2001 | Tindell et al. | |
| 6,259,976 B1 * | 7/2001 | Lemelson et al. | 701/3 |
| 6,260,567 B1 | 7/2001 | Gruensfelder et al. | |
| 6,334,753 B1 | 1/2002 | Tillman et al. | |
| 6,340,135 B1 | 1/2002 | Barton | |
| 6,360,989 B1 | 3/2002 | Maguire | |
| 6,379,110 B1 | 4/2002 | McCormick et al. | |
| 6,390,418 B1 | 5/2002 | McCormick et al. | |
| 6,651,929 B2 | 11/2003 | Dionne | |
| 6,655,632 B1 | 12/2003 | Gupta et al. | |
| 6,708,711 B2 | 3/2004 | Surply et al. | |
| 6,764,043 B2 | 7/2004 | Sankrithi et al. | |
| 6,971,229 B2 | 12/2005 | Lair | |
| 7,048,229 B2 | 5/2006 | Sanders et al. | |
| 7,090,165 B2 | 8/2006 | Jones et al. | |
| 7,131,612 B2 | 11/2006 | Baptist et al. | |
| 7,165,744 B2 | 1/2007 | Howarth et al. | |
| 7,384,016 B2 | 6/2008 | Kota et al. | |
| 7,617,670 B2 | 11/2009 | Truax et al. | |
| 7,735,601 B1 | 6/2010 | Stieger et al. | |
| 2004/0037162 A1 | 2/2004 | Flohr et al. | |
| 2004/0237534 A1 | 12/2004 | Webster et al. | |
| 2005/0274103 A1 * | 12/2005 | Prasad et al. | 60/226.1 |
| 2006/0155432 A1 * | 7/2006 | Brown | 701/14 |

FOREIGN PATENT DOCUMENTS

| | | |
|---|---|---|
| GB | 1336724 | 11/1973 |
| GB | 1382809 | 2/1975 |

OTHER PUBLICATIONS

U.S. Appl. No. 11/584,030, filed Oct. 20, 2006, Morford, et al.
U.S. Appl. No. 11/595,040, filed Nov. 10, 2006, Winter, et al.
U.S. Appl. No. 11/749,260, filed May 16, 2007, Jain, et al.
U.S. Appl. No. 11/739,216, filed Apr. 24, 2007, Jain, et al.
U.S. Appl. No. 11/750,398, filed May 18, 2007, Jain, et al.
U.S. Appl. No. 11/769,749, filed Jun. 28, 2007, Jain, et al.
Extended European Search Report for Application No. EP 08 25 2263 dated Aug. 19, 2011.
Extended European Search Report for EP 08 25 3874 dated Jan. 25, 2012.

* cited by examiner

VARIABLE CONTOUR NACELLE ASSEMBLY FOR A GAS TURBINE ENGINE

BACKGROUND OF THE INVENTION

This invention generally relates to a gas turbine engine, and more particularly to a method for influencing a variable contour of a nacelle assembly during abnormal aircraft operating conditions.

In an aircraft gas turbine engine, such as a turbofan engine, air is pressurized in a compressor and mixed with fuel in a combustor for generating hot combustion gases. The hot combustion gases flow downstream through turbine stages which extract energy from the hot combustion gases. A fan supplies air to the compressor.

Combustion gases are discharged from the turbofan engine through a core exhaust nozzle and a quantity of fan air is discharged through an annular fan exhaust nozzle defined at least partially by a nacelle assembly surrounding the core engine. A majority of propulsion thrust is provided by the pressurized fan air which is discharged through the fan exhaust nozzle, while the remaining thrust is provided by the combustion gases discharged through the core exhaust nozzle.

It is known in the field of aircraft gas turbine engines that the performance of the turbofan engine varies during diversified operability conditions experienced by the aircraft. An inlet lip section located at the foremost end of the turbofan nacelle assembly is typically designed to enable operation of the turbofan engine and reduce separation of airflow from the inner and outer flow surfaces of the inlet lip section during these diversified conditions. For example, the inlet lip section requires a "thick" inlet lip section to support operation of the engine during specific flight conditions, such as crosswind conditions, takeoff conditions and the like. Disadvantageously, the "thick" inlet lip section may reduce the efficiency of the turbofan engine during normal cruise conditions of the aircraft, for example. As a result, the maximum diameter of the nacelle assembly is approximately ten to twenty percent larger than required during cruise conditions.

An aircraft may also experience a variety of abnormal aircraft operating conditions, including but not limited to, windmilling engine-out conditions and fan blade-out conditions. Disadvantageously, the performance characteristics of the gas turbine engine may drastically decrease during abnormal aircraft operating conditions of this type. Known nacelle assemblies have not fully reduced the drag penalties, flow separation and pressure recovery problems that occur during the abnormal aircraft operating conditions.

Accordingly, it is desirable to improve the performance of a turbofan gas turbine engine during abnormal aircraft operating conditions to provide a nacelle assembly having a reduced thickness, reduced weight and reduced drag.

SUMMARY OF THE INVENTION

A gas turbine engine includes a compressor section, a combustor section, a turbine section and a nacelle assembly which at least partially surrounds the compressor section, the combustor section and the turbine section. At least a portion of the nacelle assembly includes an adjustable contour. The portion of the nacelle assembly including the adjustable contour is selectively moveable to influence the adjustable contour of the nacelle assembly. A controller identifies an abnormal aircraft operating condition and selectively moves the portion of the nacelle assembly including the adjustable contour in response to detecting the abnormal aircraft operating condition.

A method of controlling a gas turbine engine having a nacelle assembly during a plurality of operability conditions includes detecting an abnormal aircraft operating condition, and selectively manipulating an adjustable contour associated with a portion of the nacelle assembly in response to the abnormal aircraft operating condition detected.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
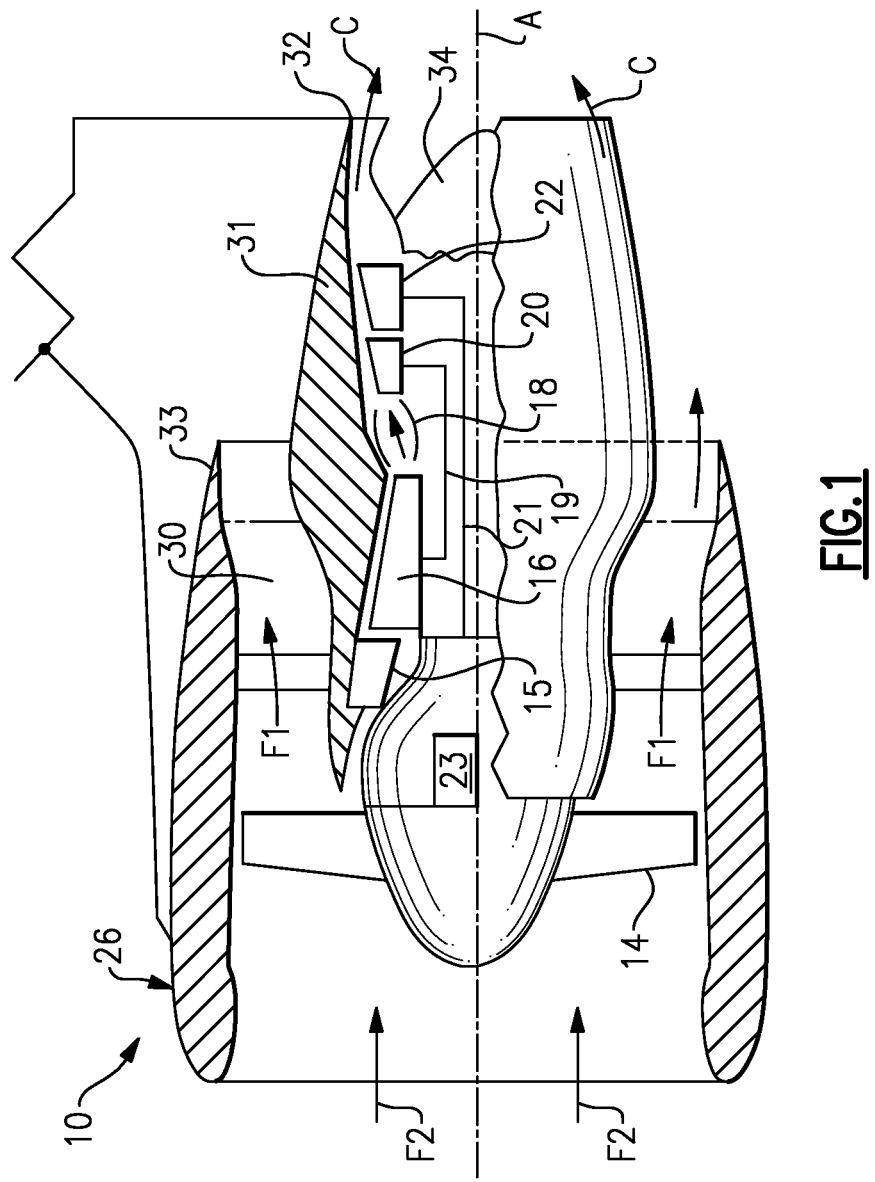
FIG. 1 illustrates a general sectional view of a gas turbine engine.

FIG. 1 illustrates a gas turbine engine 10 which includes (in serial flow communication) a fan section 14, a low pressure compressor 15, a high pressure compressor 16, a combustor 18, a high pressure turbine 20 and a low pressure turbine 22. During operation, air is pulled into the gas turbine engine 10 by the fan section 14, pressurized by the compressors 15, 16 and is mixed with fuel and burned in a combustor 18. Hot combustion gases generated within the combustor 18 flow through the high and low pressure turbines 20, 22, which extract energy from the hot combustion gases.

In a two-spool design, the high pressure turbine 20 utilizes the extracted energy from the hot combustion gases to power the high pressure compressor 16 through a high speed shaft 19, and a low pressure turbine 22 utilizes the energy extracted from the hot combustion gases to power the low pressure compressor 15 and the fan section 14 through a low speed shaft 21. However, the invention is not limited to the two-spool gas turbine architecture described and may be used with other architectures such as a single-spool axial design, a three-spool axial design and other architectures. That is, the present invention is applicable to any gas turbine engine, and to any application.

The example gas turbine engine 10 is in the form of a high bypass ratio turbofan engine mounted within a nacelle assembly 26, in which a significant amount of air pressurized by the fan section 14 bypasses the core engine 39 for the generation of propulsion thrust. The nacelle assembly 26 partially surrounds an engine casing 31, which houses the core engine 39 and its components. The airflow entering the fan section 14 may bypass the core engine 39 via a fan bypass passage 30 which extends between the nacelle assembly 26 and the engine casing 31 for receiving and communicating a discharge airflow F1. The high bypass flow arrangement provides a significant amount of thrust for powering an aircraft.

The engine 10 may include a geartrain 23 that controls the speed of the rotating fan section 14. The geartrain 23 can be any known gear system, such as a planetary gear system with orbiting planet gears, a planetary system with non-orbiting planet gears or other type of gear system. In the disclosed example, the geartrain 23 has a constant gear ratio. It should be understood, however, that the above parameters are only exemplary of a contemplated geared turbofan engine 10. That is, the invention is applicable to traditional turbofan engines as well as other engine architectures.

The discharge airflow F1 is discharged from the engine 10 through a fan exhaust nozzle 33. Core exhaust gases C are discharged from the core engine 39 through a core exhaust nozzle 32 disposed between the engine casing 31 and a center plug 34 disposed coaxially around a longitudinal centerline axis A of the gas turbine engine 10.

Figure 2:
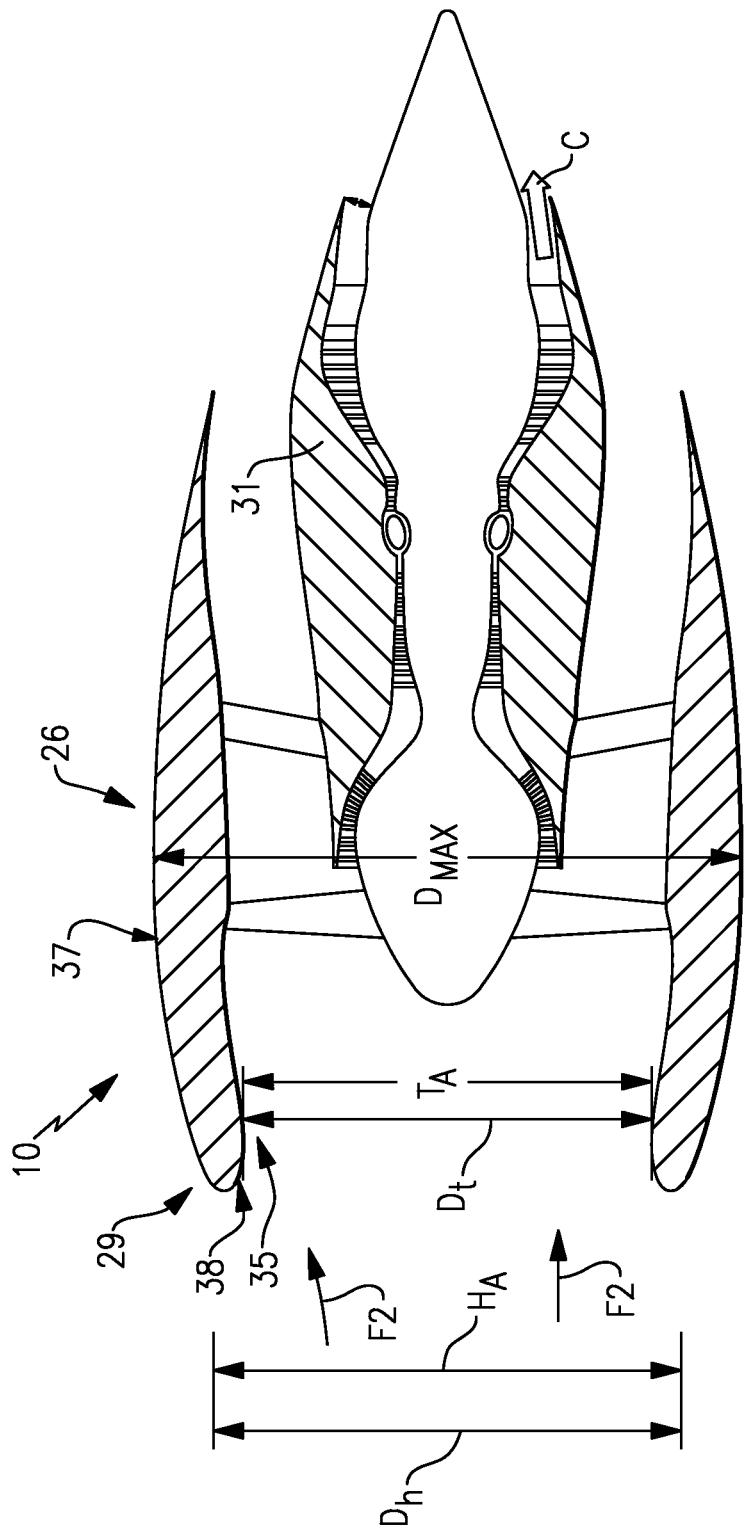
FIG. 2 illustrates a nacelle assembly of the gas turbine engine illustrated in FIG. 1.

FIG. 2 illustrates an example inlet lip section 38 of the nacelle assembly 26. The inlet lip section 38 is positioned near a forward segment 29 of the nacelle assembly 26. A boundary layer 35 is associated with the inlet lip section 38. The boundary layer 35 represents an area adjacent to the inner and outer flow surfaces of the inlet lip section 38 at which the velocity gradient of airflow is zero. That is, the velocity profile of oncoming airflow F2 goes from a free stream away from the boundary layer 35 to near zero at the boundary layer 35 due to the friction forces that occur as the oncoming airflow F2 is communicated over the inner and outer flow surfaces of the inlet lip section 38. The nacelle assembly 26 further includes a cowl section 37 positioned downstream relative to the inlet lip section 38.

The inlet lip section 38 defines a contraction ratio. The contraction ratio represents a relative thickness of an inlet lip section 38 of the nacelle assembly 26 and is represented by the ratio of a highlight area $H_a$ (ring shaped area defined by highlight diameter $D_h$) and a throat area $T_a$ (ring shaped area defined by throat diameter $D_t$ of the nacelle assembly 26). Current industry standards typically use a contraction ratio of approximately 1.33 to reduce the separation of the oncoming airflow F2 from the inner and outer flow surfaces of the inlet lip section 38 during various engine operations, but other contraction ratios may be feasible. "Thick" inlet lip section designs, which are associated with large contraction ratios, increase the maximum diameter $D_{max}$ and increase weight and drag penalties associated with the nacelle assembly 26. In addition, a desired ratio of the maximum diameter Dmax relative to the highlight diameter $D_h$ is typically less than or equal to about 1.5, for example. A person of ordinary skill in the art would understand that other ratios of the maximum diameter Dmax relative to the highlight diameter $D_h$ are possible and will vary depending upon design specific parameters.

Dynamically and actively adjusting a variable contour associated with a portion of a nacelle assembly 26 during abnormal aircraft operating conditions increases the amount of airflow communicated through the gas turbine engine 10 and reduces the amount of flow separation experienced at the internal and external flow surfaces of the inlet lip section 38. Flow separation at the internal flow surface causes a reduction in pressure recovery (i.e., the ratio of the pressure of oncoming airflow F2 relative to the pressure of airflow entering the fan section 14) of the gas turbine engine 10. Flow separation at the external flow surfaces of the inlet lip section 38 results in increased drag penalties. Control logic is used to actively manipulate the variable contour of the nacelle assembly 26. The variable contour aspects of the nacelle assembly 26 may be achieved at a variety of locations of the nacelle assembly 26 and via a variety of mechanisms, as is further discussed below.

Figure 3:
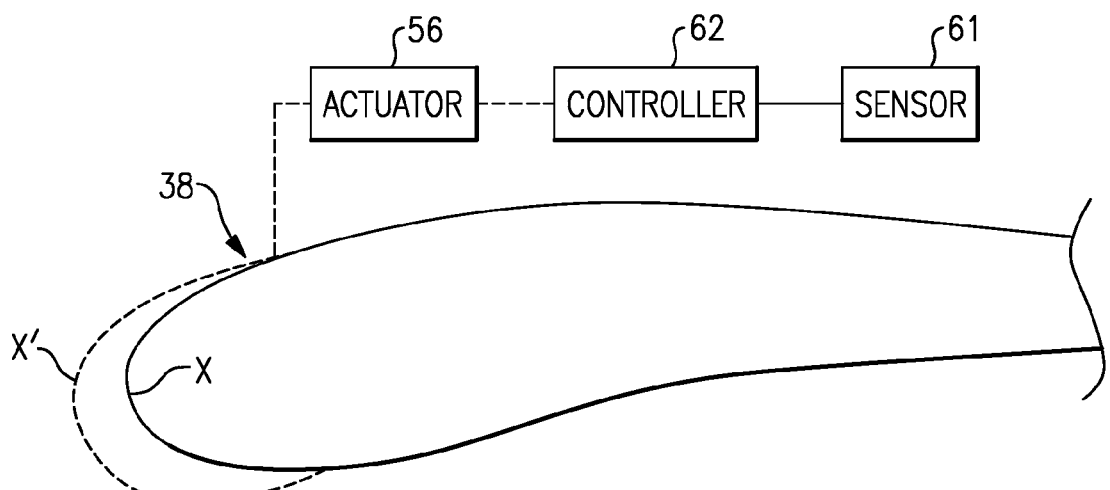
FIG. 3 illustrates a moveable portion of the nacelle assembly of the gas turbine engine shown in FIG. 1.

FIG. 3 illustrates an example inlet lip section 38 having an adjustable contour. Although shown with respect to the inlet lip section 38, a person of ordinary skill in the art having the benefit of this disclosure would understand that any portion of the nacelle assembly 26, or any combination of portions, may be provided with an adjustable contour.

Figure 4:
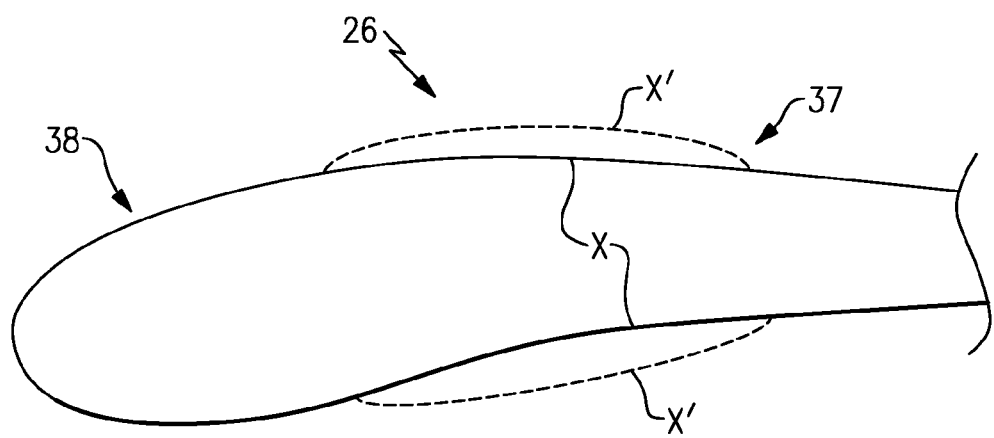
FIG. 4 illustrates another example moveable portion of the nacelle assembly of the gas turbine engine shown in FIG. 1.

The inlet lip section 38 is moved to influence the adjustable contour of inlet lip section 38 in response to detecting an abnormal aircraft operating condition, in one example. In another example, the cowl section 37 includes the adjustable contour (See FIG. 4). In yet another example, both the inlet lip section 38 and the cowl section 37 include adjustable contours. Adjusting the contour of the inlet lip section 38 during diverse conditions increases the operational effectiveness of the gas turbine engine 10.

A sensor 61 detects the abnormal aircraft operating condition and communicates with a controller 62 to actively translate the inlet lip section 38 and manipulate the adjustable contour thereof. Of course, this view is highly schematic. In addition, the illustrations of the movement of the inlet lip section 38 are shown exaggerated to better illustrate the adjustable contour of the inlet lip section 38. A person of ordinary skill in the art would understand the distances the inlet lip section 38 should be displaced in response to sensing each specific abnormal aircraft operating condition. It should be understood that the sensor 61 and the controller 62 may be programmed to detect any known abnormal aircraft operating condition and that each abnormal aircraft operating condition may be associated with a distinct contour of the inlet lip section 38. That is, the sensor 61 and the controller 62 are operable to manipulate the adjustable contour of inlet lip section 38 to a position which corresponds to the abnormal aircraft operating condition that is detected (i.e., the adjustable contour is controlled via a predetermined schedule programmed within the controller 62 prior to flight). Also, the sensor 61 can be replaced by any controller associated with the gas turbine engine 10 or an associated aircraft. In fact, the controller 62 itself can generate the signal to adjust the contour of the inlet lip section 38.

The inlet lip section 38 is selectively moveable between a first position X and a second position X' (represented by phantom lines) via an actuator assembly 56 to manipulate the adjustable contour associated with the inlet lip section 38 in response to detecting an abnormal aircraft operating condition of the gas turbine engine 10, for example. A "thick" inlet lip section 38 is desired during abnormal aircraft operating conditions to reduce the onset of flow separation. In one example, the second position X' is axially upstream relative to the first position X. In another example, the second position X' is radially outward relative to the first position X. In yet another example, the second position X' is both axially upstream and radially outward relative to the first position X. It should be understood that the actual positioning of the second position X' relative to the first position X will vary depending upon the abnormal aircraft operating condition detected. A person of ordinary skill in the art would understand that the attached Figures therefore represent only one possible position of the inlet lip section 38.

Figure 5:
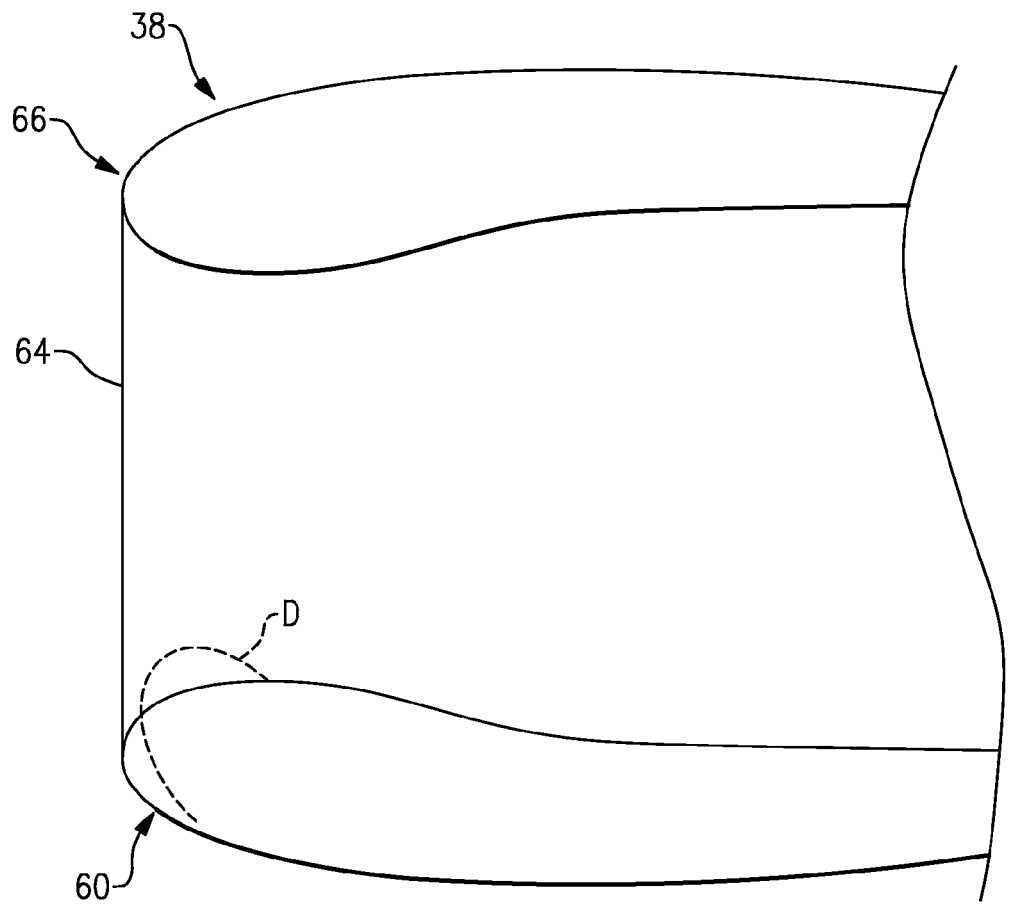
FIG. 5 illustrates a side view of an inlet lip section of the nacelle assembly.

The adjustable contour of the inlet lip section 38 may also be influenced during abnormal aircraft operating conditions by "drooping" a portion of the inlet lip section 38 relative to a remaining portion of the inlet lip section 38 (See FIG. 5). In one example, a bottom portion 60 of the inlet lip section 38 is pivoted relative to a plane 64 defined by the foremost end 66 of the inlet lip section 38. The bottom portion 60 is pivoted inwardly at an angle between 2 to 6 degrees relative to the plane 64 (shown in phantom lines as "droop" position D), in one example. Although FIG. 5 illustrates the "droop" of the bottom portion 60 relative to the remaining portion of the inlet lip section 38, it should be understood that any portion of the inlet lip section 38 may be drooped to achieve the desired reduction of flow separation during certain abnormal aircraft operating conditions.

A person of ordinary skill in the art having the benefit of this disclosure will be able to implement an appropriate actuator assembly 56 to manipulate the adjustable contour, including but not limited to pneumatic, hydraulic and electromagnetic actuator assemblies. Additionally, the inlet lip section 38 is moveable to any position between the first position X and the second position X'. Altering the inlet lip section 38 contour increases the airflow communicated through the engine and reduces the drag experienced by the nacelle assembly 26 during certain abnormal aircraft operating conditions thereby improving the propulsion performance of the aircraft. The inlet lip section 38 is returned to the first position X during normal cruise operations of the aircraft.

In one example, the abnormal aircraft operating condition includes a windmilling engine-out condition. A windmilling engine-out condition occurs when an engine of a multi-engine aircraft losses functionality or is otherwise shutdown. The shutdown engine is advantageously permitted to rotate, and is driven by an airflow resulting from the forward velocity of the aircraft (i.e., the damaged engine is permitted to windmill). Adjusting the contour of the inlet lip section 38 during the windmilling condition permits communication of an increased amount of airflow through the engine and reduces the drag experienced by the nacelle assembly 26. This facilitates relight of the engine 10. Subsequent to the relight, the inlet lip section 38 contour is restored to its nominal shape (i.e., the first position X).

In another example, the adjustable contour of the inlet lip section 38 is manipulated in response to detecting a crosswind take-off condition. Crosswind take-off conditions are experienced during take-off as an aircraft travels down a runway (i.e., where the aircraft experiences airflow in a roughly perpendicular direction with respect to the movement of aircraft down the runway). In still another example, the abnormal aircraft operating condition includes a fan blade-out condition (i.e., a fan blade from fan section 14 becomes dislodged). In yet another example, the abnormal aircraft operating condition includes a high angle of attack condition. In yet another example, the abnormal aircraft operating condition includes yaw conditions. Yaw conditions are experienced in flight where an aircraft is traveling sideways in a direction perpendicular to the airflow. The airflow causes the aircraft to shift in a side-to-side motion, otherwise known as aircraft yaw. It should be understood that the manipulation of the adjustable contour of the lip section 38, or any other portion of the nacelle assembly 26, may be achieved by moving the inlet lip section 38 to the second position X', or to any other intermediate position, in response to any operating condition experienced by the aircraft.

Figure 6:
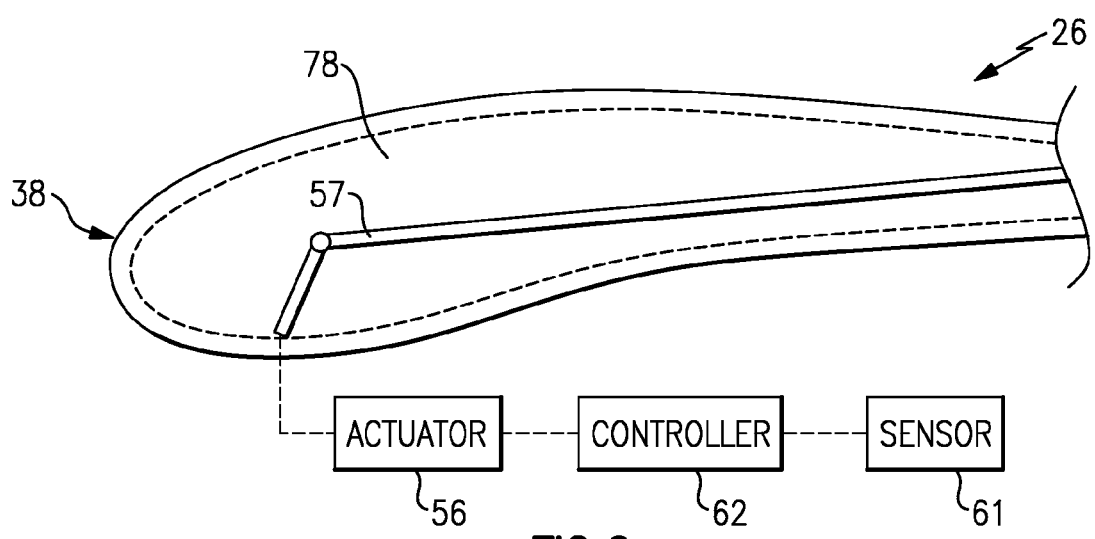
FIG. 6 illustrates a first example mechanism for manipulating a variable contour of the nacelle assembly.

The manipulation of the adjustable contour of the nacelle assembly 26 may be achieved in a variety of ways. FIG. 6 illustrates an example internal linkage 57 utilized to manipulate the contour associated with the inlet lip section 38 of the nacelle assembly 26. Although the example illustrated in FIG. 6 is shown in association with the inlet lip section 38, it should be understood that the internal linkage 57 could be utilized to adjust the contour associated with any portion of the nacelle assembly 26. The internal linkage 57 is housed within a cavity 78 of the inlet lip section 38. The actuator assembly 56 deploys the internal linkage 57 by pivoting, toggling, and/or extending the internal linkage 57 to adjust the contour.

The nacelle assembly 26 includes an outer skin comprised of a flexible material that is adjustable to manipulate the contour associated with a portion of the nacelle assembly 26. In one example, the outer skin includes an aluminum alloy. In another example, the outer skin comprises a titanium alloy. A person of ordinary skill in the art having the benefit of this disclosure would be able to choose an appropriate material for the flexible outer skin.

Figure 7:
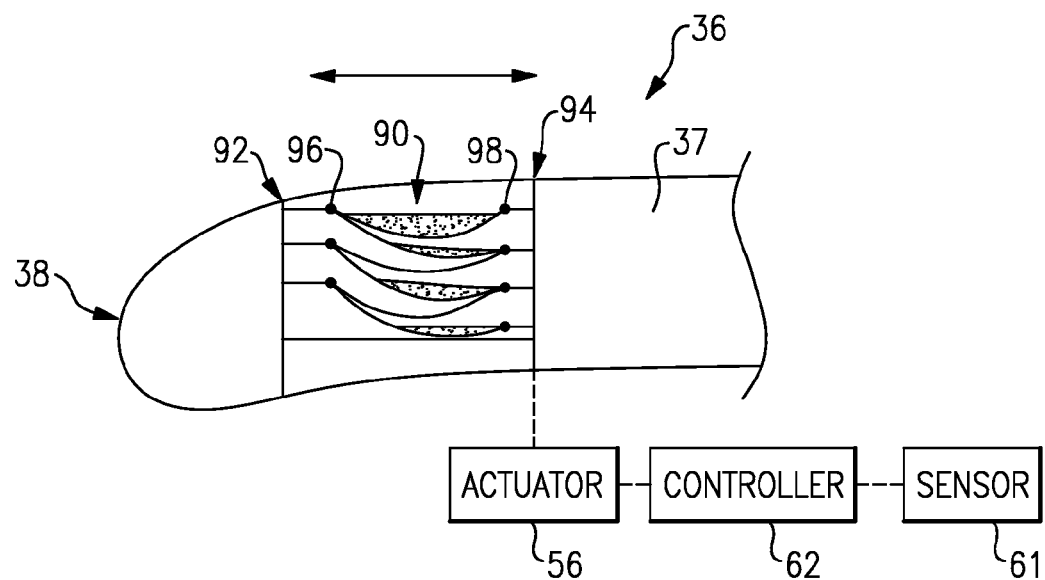
FIG. 7 illustrates a second example mechanism for manipulating the variable contour of the nacelle assembly.

FIG. 7 illustrates a second example mechanism for adjusting the contour of the nacelle assembly 26. In this example, the inlet lip section 38 includes a plurality of bellows 90 positioned between a front bulkhead 92 and a maximum thickness point 94 of the inlet lip section 38. The bellows 90 extend circumferentially about the entire nacelle assembly 26, although only a single position of the bellows 90 is illustrated in FIG. 7. Each bellow 90 includes a first hinge 96 positioned adjacent to the front bulk head 92 and a second hinge 98 positioned adjacent to the maximum thickness point 94 in the inlet lip section 38. Each bellow 90 is translatable to adjust the contour of the inlet lip section 38 by moving the hinges 96, 98 either toward or away from one another (i.e., in either an upstream direction or downstream direction relative to one another). The actuator assembly 56 translates the bellows 90 in response to receiving a signal from the controller 62 representing a detected abnormal aircraft operating condition, for example.

The bellows 90 of the nacelle assembly 26 include an outer skin comprised of a flexible material. In one example, the outer skin includes an aluminum alloy. In another example, the outer skin comprises a titanium alloy. A person of ordinary skill in the art having the benefit of this disclosure will be able to choose an appropriate material for the flexible outer skin.

Figure 8:
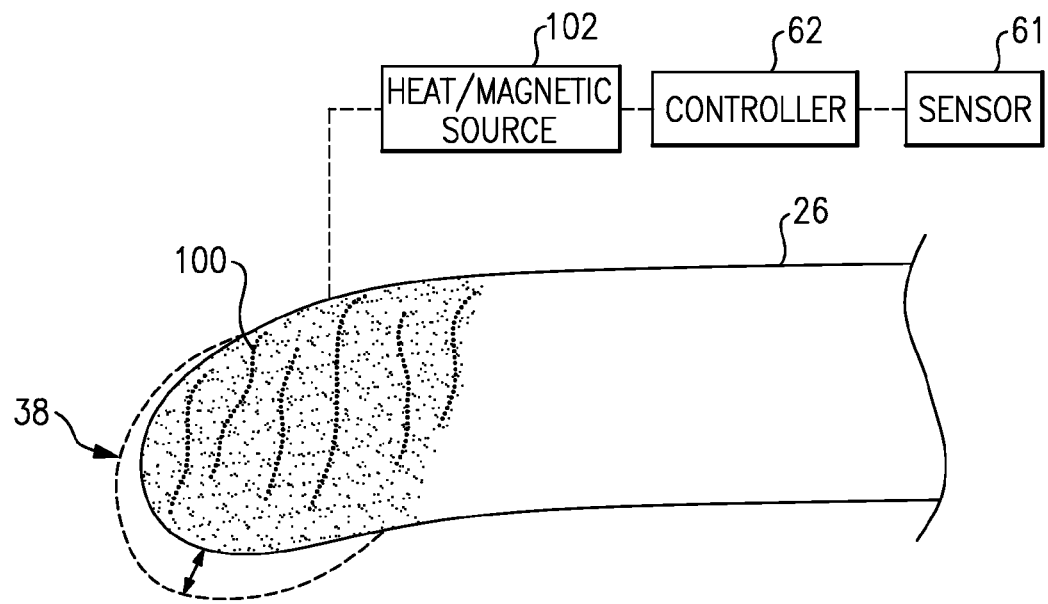
FIG. 8 illustrates yet another example mechanism for manipulating the variable contour of the nacelle assembly.

FIG. 8 illustrates yet another example mechanism for manipulating the adjustable contour associated with a portion of the nacelle assembly 26. In this example, the inlet lip section 38 comprises a shape memory alloy 100 having a first solid phase that corresponds to a first shape of the inlet lip section 38 and a second solid phase that corresponds to a second shape of the inlet lip section 38. The inlet lip section 38 may be transitioned between the first solid phase and the second solid phase to adjust the contour associated with the inlet lip section 38. The shape memory alloy 100 is thermally or magnetically active to transition between the phases and manipulate the adjustable contour of the inlet lip section 38.

One example of a thermally active shape memory alloy includes a nickel titanium alloy. A second example thermally active shape memory alloy includes a copper zinc aluminum alloy. Yet another example thermally active shape memory alloy includes a copper aluminum nickel alloy. One example mechanically active shape memory alloy includes a nickel manganese gallium alloy. However, other shape memory alloys may be utilized, as would be understood by those of ordinary skill in the art having the benefit of this disclosure. In combination with a source 102 that provides heat or a magnetic field in response to receiving a signal from the controller 62, the shape memory alloy 100 adjusts to manipulate the adjustable contour of the inlet lip section 38.

To achieve the adjustable contour manipulation, the inlet lip section 38 of the nacelle assembly 26 includes an outer skin comprised of a flexible material. In one example, the outer skin includes an aluminum alloy. In another example, the outer skin comprises a titanium alloy. A person of ordinary skill in the art having the benefit of this disclosure would be able to choose an appropriate material for the flexible outer skin.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A gas turbine engine, comprising:
   a compressor section, a combustor section, and a turbine section;
   a nacelle assembly at least partially surrounding at least one of said compressor section, said combustor section and said turbine section, wherein said nacelle assembly includes an inlet lip section and a cowl section that each include an adjustable contour, each of said inlet lip section and said cowl section including a first surface that faces radially inward and a second surface that faces radially outward, each of said first surfaces and said second surfaces being moveable to influence said adjustable contours; and
   a controller that identifies an abnormal aircraft operating condition, wherein said controller selectively moves said inlet lip section and said cowl section of said nacelle assembly in response to detecting said abnormal aircraft operating condition.

2. The gas turbine engine as recited in claim 1, wherein said abnormal aircraft operating condition includes at least one of a windmilling engine-out condition, a crosswind take-off condition, a fan blade-out condition, a high angle of attack condition and a yaw condition.

3. The gas turbine engine as recited in claim 1, comprising a sensor that produces a signal representing said abnormal aircraft operating condition and communicates said signal to said controller.

4. The gas turbine engine as recited in claim 1, comprising an actuator assembly in communication with said controller to move said nacelle assembly in response to detecting said abnormal aircraft operating condition.

5. The gas turbine engine as recited in claim 4, comprising at least one of an internal linkage, a plurality of bellows and a shape memory alloy that is actuated by said actuator assembly to influence said adjustable contours.

6. The gas turbine engine as recited in claim 1, wherein at least one of said first surfaces and said second surfaces are moveable between a first position and a second position, and said second position is axially upstream relative to said first position.

7. The gas turbine engine as recited in claim 1, wherein at least one of said first surfaces and said second surfaces are moveable between a first position and a second position, and said second position is radially outward relative to said first position.

8. The gas turbine engine as recited in claim 1, wherein said inlet lip section is pivoted relative to said cowl section, wherein said inlet lip section is inwardly pivoted at an angle relative to a plane positioned at a foremost end of said nacelle assembly.

9. The gas turbine engine as recited in claim 1, comprising a plurality of bellows that influence said adjustable contours.

10. The gas turbine engine as recited in claim 1, comprising a shape memory alloy that influences said adjustable contours.

11. The gas turbine engine as recited in claim 1, wherein said abnormal aircraft operating condition includes at least one of a windmilling engine-out condition, a fan blade-out condition, a high angle of attack condition and a yaw condition.

12. The gas turbine engine as recited in claim 1, wherein said abnormal aircraft operating condition is a windmilling engine-out condition.

13. The gas turbine engine as recited in claim 1, wherein said abnormal aircraft operating condition is a crosswind condition.

14. The gas turbine engine as recited in claim 1, wherein said abnormal aircraft operating condition is a fan blade-out condition.

15. The gas turbine engine as recited in claim 1, wherein said abnormal aircraft operating condition is a yaw condition.

16. The gas turbine engine as recited in claim 1, wherein said first surfaces and said second surfaces are moveable between a first position and a second position, and said second position is both axially upstream and readily outward relative to said first position.

* * * * *